*(12)* United States Patent
Krause Perin et al.

(10) Patent No.: US 11,385,351 B2
(45) Date of Patent: Jul. 12, 2022

(54) TECHNIQUES FOR AUTOMATICALLY ADJUSTING DETECTION THRESHOLD OF FMCW LIDAR

(71) Applicant: AEVA, INC., Mountain View, CA (US)

(72) Inventors: Jose Krause Perin, Mountain View, CA (US); Kumar Bhargav Viswanatha, Santa Clara, CA (US); Rajendra Tushar Moorti, Mountain View, CA (US); Mina Rezk, Haymarket, VA (US)

(73) Assignee: Aeva, Inc., Mountain View, CA (US)

( * ) Notice: Subject to any disclaimer, the term of this patent is extended or adjusted under 35 U.S.C. 154(b) by 0 days.

(21) Appl. No.: 17/339,737

(22) Filed: Jun. 4, 2021

(65) Prior Publication Data

US 2022/0120903 A1 Apr. 21, 2022

Related U.S. Application Data

(60) Provisional application No. 63/093,621, filed on Oct. 19, 2020.

(51) Int. Cl.
*G01S 17/34* (2020.01)
*G01S 17/89* (2020.01)

(52) U.S. Cl.
CPC .............. *G01S 17/34* (2020.01); *G01S 17/89* (2013.01)

(58) Field of Classification Search
CPC ........ G01S 17/34; G01S 17/89; G01S 17/931; G01S 7/497; G01S 13/865; G01S 13/867; G01S 13/931; G01S 17/10; G01S 17/86; G01S 17/87; G01S 7/4814; G01S 7/483; G01S 7/4861; G05D 1/0088; G05D 1/0251; G05D 1/0257; G05D 2201/0213;
(Continued)

(56) References Cited

U.S. PATENT DOCUMENTS

2020/0200904 A1* 6/2020 Singer .................... B60W 10/20
2020/0355831 A1* 11/2020 Gassend ................ G01S 17/931
(Continued)

FOREIGN PATENT DOCUMENTS

WO WO-2021178163 A1 * 9/2021

*Primary Examiner* — Yuqing Xiao
*Assistant Examiner* — Amir J Askarian
(74) *Attorney, Agent, or Firm* — Womble Bond Dickinson (US) LLP

(57) ABSTRACT

A method of adjusting a detection threshold in a frequency-modulated continuous wave (FMCW) light detection and ranging (LIDAR) system includes determining a first confidence threshold for detecting a first target from multiple targets within a frequency range, wherein the frequency range comprises frequencies corresponding to the targets. The method further includes determining a subset of frequencies within the frequency range for detecting a second target. The second target transmits signals within the subset of frequencies lower than the first confidence threshold. The method further includes adjusting the first confidence threshold to a second confidence threshold at the subset of frequencies for detecting the second target within the subset of frequencies and restoring the second confidence threshold to the first confidence threshold outside the subset of frequencies for detecting the first target.

20 Claims, 10 Drawing Sheets

(58) Field of Classification Search
CPC ......... B60W 2420/42; B60W 2420/52; B60W 2556/45; B60W 30/0956; B60W 60/001; G06V 10/44; G06V 10/507; G06V 10/89; G06V 20/56; G08G 1/0112; G08G 1/0116; G08G 1/04; G08G 1/048
See application file for complete search history.

(56) References Cited

U.S. PATENT DOCUMENTS

2021/0191399 A1* 6/2021 Verghese ................. G08G 1/04
2021/0195112 A1* 6/2021 Verghese ................ G01S 17/89

* cited by examiner

TECHNIQUES FOR AUTOMATICALLY ADJUSTING DETECTION THRESHOLD OF FMCW LIDAR

RELATED APPLICATIONS

This application claims priority from and the benefit of U.S. Provisional Patent Application No. 63/093,621 filed on Oct. 19, 2020, the entire contents of which are incorporated herein by reference in their entirety.

FIELD

The present disclosure is related to light detection and ranging (LIDAR) systems in general, and more particularly to adjusting detection thresholds in frequency-modulated continuous-wave (FMCW) LIDAR systems for target detection.

BACKGROUND

Frequency-Modulated Continuous-Wave (FMCW) LIDAR systems use tunable, infrared lasers for frequency-chirped illumination of targets, and coherent receivers for detection of backscattered or reflected light from the targets that are combined with a local copy of the transmitted signal. Mixing the local copy with the return signal, delayed by the round-trip time to the target and back, generates signals at the receiver with frequencies that are proportional to the distance to each target in the field of view of the system. Human safety considerations mandate the use of low-power lasers so that reflections from objects have very low signal strength. The range and accuracy of a LIDAR system is a function of signal-to-noise ratio, yet conventional solutions fail to reliably detect targets with a weak return signal while also limiting false target detections.

SUMMARY

The present disclosure describes examples of systems and methods for automatically adjusting a detection threshold for target detection.

A light detection and ranging (LIDAR) system includes an optical scanner to transmit an optical beam towards, and receive a return signal from, a target, an optical processing system coupled to the optical scanner to generate a baseband signal in a time domain from the return signal, the baseband signal comprising frequencies corresponding to LIDAR target ranges, and a signal processing system coupled to the optical processing system. The signal processing system includes a processor and a memory operatively coupled to the processor, the memory to store instructions that, when executed by the processor, cause the LIDAR system to determine a first confidence threshold for detecting a first target from multiple targets within a frequency range, wherein the frequency range comprises different frequencies corresponding to the targets. The processor my further determine a subset of frequencies within the frequency range for detecting a second target, wherein the second target transmits signals within the subset of frequencies lower than the first confidence threshold, adjust the first confidence threshold to a second confidence threshold at the subset of frequencies for detecting the second target within the subset of frequencies, and restore the second confidence threshold to the first confidence threshold outside the subset of frequencies for detecting the first target.

In some embodiments, to determine the first confidence threshold, the processor is further to determine a noise estimate across the frequency range and calculate a difference between a magnitude of frequencies and the noise estimate across the frequency range. In some embodiments, the first confidence threshold is based on at least one of a signal-to-noise ratio or a likelihood ratio providing a confidence value for a target detection. In some embodiments, to determine the subset of frequencies within the frequency range for detecting the second target the processor is to determine the subset of frequencies based on an estimated location of the second target. In some embodiments, the processor is further to identify previous detections of the second target in the time domain or frequency domain and determine the estimated location of the second target based on the previous detections of the second target.

In some embodiments, to determine the estimated location of the second target, the processor is to identify point cloud information associated with the second target and determine the estimated location of the second target based on the point cloud information. In some embodiments, the subset of frequencies comprises a predefined range of frequencies corresponding to a previously detected location of the second target. In some embodiments, to adjust the first confidence threshold, the processor is to reduce the first confidence threshold to the second confidence threshold within the subset of frequencies, wherein the subset of frequencies corresponds to an estimated location of the second target. In some embodiments, the processor is further to determine the subset of frequencies corresponding to the estimated location of the second target based on a confidence value associated with the estimated location of the second target. In some embodiments, the processor is further to determine whether one or more previous detections of the second target comprises a weak detection signal, determine an estimated location of the second target, and adjust the first confidence threshold in response to determining that the one or more previous detections of the target comprises the weak detection signal.

In some embodiments, a method, includes determining a first confidence threshold for detecting a first target from multiple targets within a frequency range, wherein the frequency range comprises different frequencies corresponding to the targets and determining a subset of frequencies within the frequency range for detecting a second target, wherein the second target transmits signals within the subset of frequencies lower than the first confidence threshold. The method may further include adjusting the first confidence threshold to a second confidence threshold at the subset of frequencies for detecting the second target within the subset of frequencies and restoring the second confidence threshold to the first confidence threshold outside the subset of frequencies for detecting the first target.

In some embodiments, a non-transitory computer-readable medium containing instructions that, when executed by a processing device in a LIDAR system, cause the processing device of the LIDAR system to determine a first confidence threshold for detecting a first target from multiple targets within a frequency range, wherein the frequency range comprises different frequencies corresponding to the targets. The processor my further determine a subset of frequencies within the frequency range for detecting a second target, wherein the second target transmits signals within the subset of frequencies lower than the first confidence threshold, adjust the first confidence threshold to a second confidence threshold at the subset of frequencies for detecting the second target within the subset of frequencies, and restore the second confidence threshold to the first confidence threshold outside the subset of frequencies for detecting the first target.

BRIEF DESCRIPTION OF THE DRAWINGS

For a more complete understanding of various examples, reference is now made to the following detailed description taken in connection with the accompanying drawings in which like identifiers correspond to like elements.

DETAILED DESCRIPTION

The present disclosure describes various examples of LIDAR systems and methods for automatically adjusting a detection threshold of a LIDAR system to improve target detection and reduce false detections. According to some embodiments, the described LIDAR system may be implemented in any sensing market, such as, but not limited to, transportation, manufacturing, metrology, medical, virtual reality, augmented reality, and security systems. According to some embodiments, the described LIDAR system can be implemented as part of a front-end of frequency modulated continuous-wave (FMCW) device that assists with spatial awareness for automated driver assist systems, or self-driving vehicles.

Lidar systems described by the embodiments herein include coherent scan technology to detect a signal returned from a target to generate a coherent heterodyne signal, from which range and velocity information of the target may be extracted. The signal may be converted into one or more frequency bins, each with a magnitude of the associated frequencies within the bin. In some scenarios, a target detection may correspond to a large magnitude (i.e., a peak) for one or more frequency bins. According to some embodiments, to determine whether the peak has a large enough magnitude to correspond to a detected target, the LIDAR system may use a detection threshold. In some scenarios, a detection threshold may be increased to reduce false target detections. On the other hand, the detection threshold may be set low to increase the probability of detecting weaker signals. Using the techniques described herein, embodiments of the present invention can, among other things, address the issues described above by reducing the detection threshold in a small frequency band in the vicinity of an estimated location of a target. Accordingly, the probability of detection is increased for targets returning a weak signal while maintaining the higher detection threshold for the remaining frequency domain to limit false detections.

Figure 1:
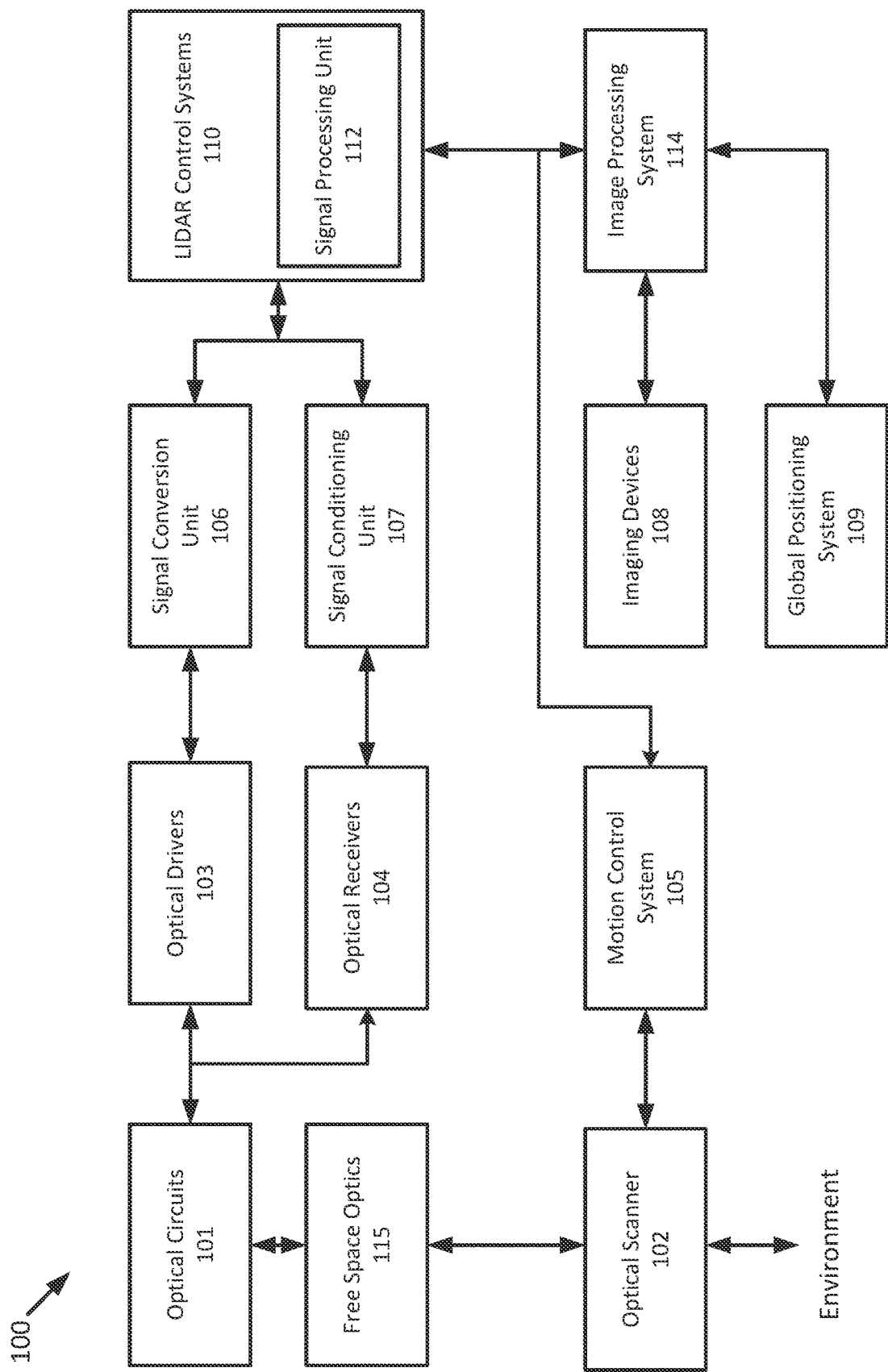
FIG. 1 is a block diagram illustrating an example LIDAR system according to the present disclosure.

FIG. 1 illustrates a LIDAR system 100 according to example implementations of the present disclosure. The LIDAR system 100 includes one or more of each of a number of components, but may include fewer or additional components than shown in FIG. 1. One or more of the components depicted in FIG. 1 can be implemented on a photonics chip, according to some embodiments. The optical circuits 101 may include a combination of active optical components and passive optical components. Active optical components may generate, amplify, and/or detect optical signals and the like. In some examples, the active optical component includes optical beams at different wavelengths, and includes one or more optical amplifiers, one or more optical detectors, or the like.

Free space optics 115 may include one or more optical waveguides to carry optical signals, and route and manipulate optical signals to appropriate input/output ports of the active optical circuit. The free space optics 115 may also include one or more optical components such as taps, wavelength division multiplexers (WDM), splitters/combiners, polarization beam splitters (PBS), collimators, couplers, non-reciprocal elements such as Faraday rotator or the like. In some examples, the free space optics 115 may include components to transform the polarization state and direct received polarized light to optical detectors using a PBS, for example. The free space optics 115 may further include a diffractive element to deflect optical beams having different frequencies at different angles along an axis (e.g., a fast-axis).

In some examples, the LIDAR system 100 includes an optical scanner 102 that includes one or more scanning mirrors that are rotatable along an axis (e.g., a slow-axis) that is orthogonal or substantially orthogonal to the fast-axis of the diffractive element to steer optical signals to scan an environment according to a scanning pattern. For instance, the scanning mirrors may be rotatable by one or more galvanometers. The optical scanner 102 also collects light incident upon any objects in the environment into a return optical beam that is returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coated window or the like.

To control and support the optical circuits 101 and optical scanner 102, the LIDAR system 100 includes LIDAR control systems 110. The LIDAR control systems 110 may include a processing device such as signal processing unit 112. In some examples, signal processing unit 112 may be one or more general-purpose processing devices such as a microprocessor, central processing unit, or the like. More particularly, signal processing unit 112 may be complex instruction set computing (CISC) microprocessor, reduced instruction set computer (RISC) microprocessor, very long instruction word (VLIW) microprocessor, or processor implementing other instruction sets, or processors implementing a combination of instruction sets. Signal processing unit 112 may also be one or more special-purpose processing devices such as an application specific integrated circuit (ASIC), a field programmable gate array (FPGA), a digital signal processor (DSP), network processor, or the like.

In some examples, signal processing unit 112 is a digital signal processor (DSP). The LIDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LIDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some examples, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LIDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LIDAR control systems 110. In some examples, the signals from the optical receivers 104 may be subject to signal conditioning by signal conditioning unit 107 prior to receipt by the LIDAR control systems 110. For example, the signals from the optical receivers 104 may be provided to an operational amplifier for amplification of the received signals and the amplified signals may be provided to the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control systems 110 or other systems connected to the LIDAR system 100.

In operation according to some examples, the LIDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LIDAR control systems 110. The LIDAR control systems 110 instruct the optical drivers 103 to independently modulate one or more optical beams, and these modulated signals propagate through the passive optical circuit to the collimator. The collimator directs the light at the optical scanning system that scans the environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104.

The analog signals from the optical receivers 104 are converted to digital signals using ADCs. The digital signals are then sent to the LIDAR control systems 110. A signal processing unit 112 may then receive the digital signals and interpret them. In some embodiments, the signal processing unit 112 also receives position data from the motion control system 105 and galvanometers (not shown) as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data to provide a precise global location.

Figure 2:
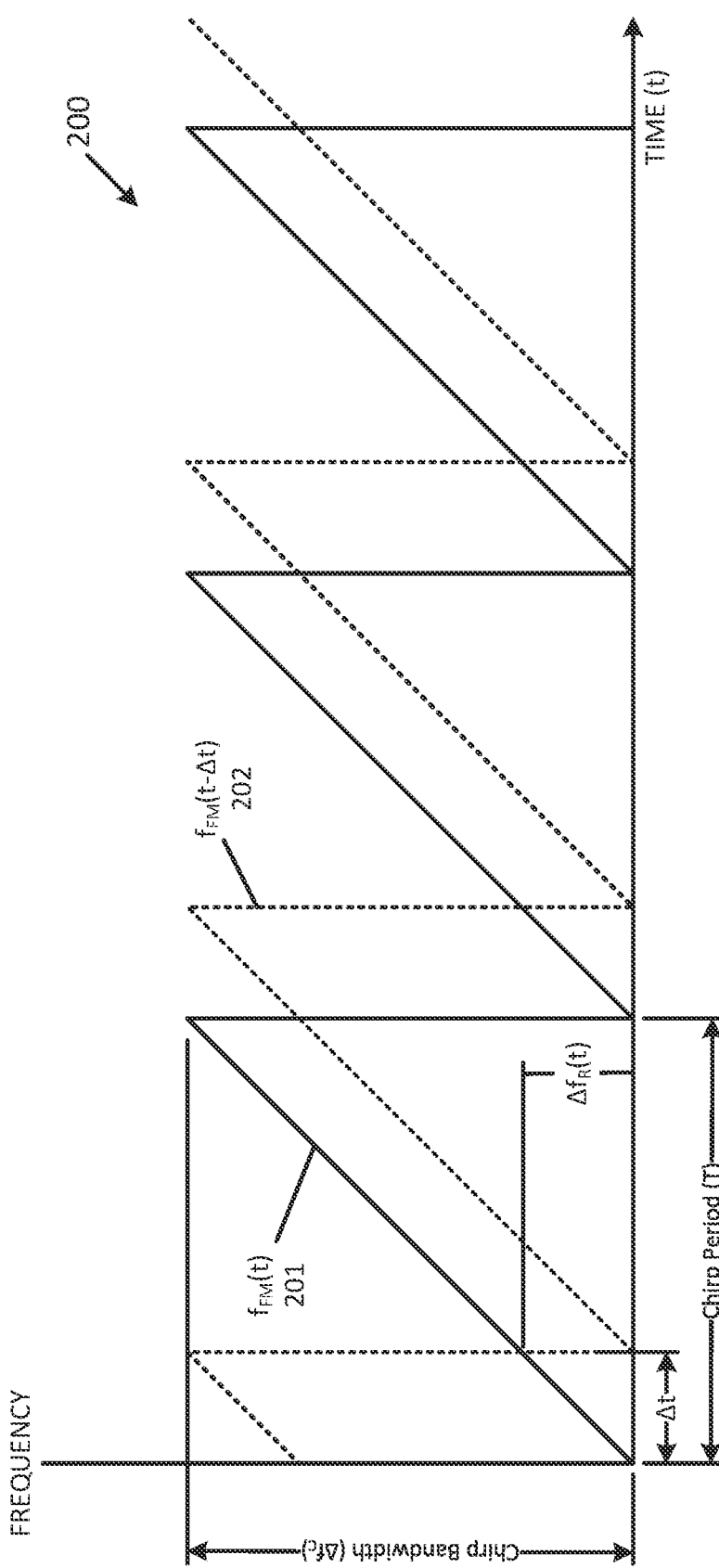
FIG. 2 is a time-frequency diagram illustrating one example of LIDAR waveforms according to the present disclosure.

FIG. 2 is a time-frequency diagram 200 of an FMCW scanning signal 201 that can be used by a LIDAR system, such as system 100, to scan a target environment according to some embodiments. In one example, the scanning waveform 201, labeled as $f_{FM}(t)$, is a sawtooth waveform (sawtooth "chirp") with a chirp bandwidth $\Delta F_C$ and a chirp period $T_C$. The slope of the sawtooth is given as $k=(\Delta f_C/T_C)$. FIG. 2 also depicts target return signal 202 according to some embodiments. Target return signal 202, labeled as $f_{FM}(t-\Delta t)$, is a time-delayed version of the scanning signal 201, where $\Delta t$ is the round trip time to and from a target illuminated by scanning signal 201. The round trip time is given as $\Delta t=2R/$ v, where R is the target range and v is the velocity of the optical beam, which is the speed of light c. The target range, R, can therefore be calculated as $R=c(\Delta t/2)$. When the return signal 202 is optically mixed with the scanning signal, a range dependent difference frequency ("beat frequency") $\Delta f_R(t)$ is generated. The beat frequency $\Delta f_R(t)$ is linearly related to the time delay $\Delta t$ by the slope of the sawtooth k. That is, $\Delta f_R(t)=k\Delta t$. Since the target range R is proportional to $\Delta t$, the target range R can be calculated as $R=(c/2)(\Delta f_R(t)/k)$. That is, the range R is linearly related to the beat frequency $\Delta f_R(t)$. The beat frequency $\Delta f_R(t)$ can be generated, for example, as an analog signal in optical receivers 104 of system 100. The beat frequency can then be digitized by an analog-to-digital converter (ADC), for example, in a signal conditioning unit such as signal conditioning unit 107 in LIDAR system 100. The digitized beat frequency signal can then be digitally processed, for example, in a signal processing unit, such as signal processing unit 112 in system 100. It should be noted that the target return signal 202 will, in general, also includes a frequency offset (Doppler shift) if the target has a velocity relative to the LIDAR system 100. The Doppler shift can be determined separately, and used to correct the frequency of the return signal, so the Doppler shift is not shown in FIG. 2 for simplicity and ease of explanation. It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing ($\Delta f_{Rmax}$) is 500 megahertz. This limit in turn determines the maximum range of the system as $R_{max}=(c/2)(\Delta f_{Rmax}/k)$ which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number of full rotations in azimuth by the optical scanner. It should be noted that while embodiments of the present disclosure may be used in conjunction with FMCW LiDAR, the disclosure is not limited to FMCW LiDAR and embodiments may be used with any other form of coherent LiDAR as well.

Figure 3A:
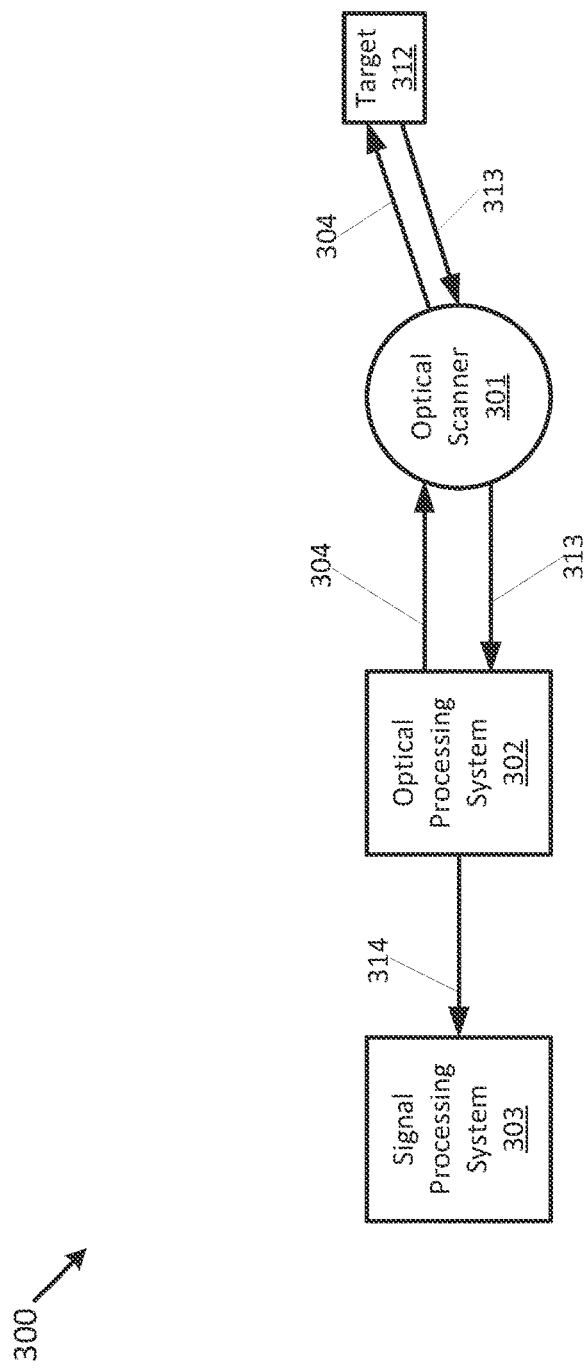
FIG. 3A is a block diagram illustrating an example LIDAR system according to the present disclosure.

FIG. 3A is a block diagram illustrating an example FMCW LIDAR system 300 according to the present disclosure. Example system 300 includes an optical scanner 301 to transmit an FMCW infrared (IR) optical beam 304 and to receive a return signal 313 from reflections of the optical beam 304 from targets such as target 312 in the field of view (FOV) of the optical scanner 301. System 300 also includes an optical processing system 302 to generate an electrical signal 314 in the time domain from the return signal 313, where the electrical signal 314 contains frequencies corresponding to LIDAR target ranges. According to some embodiments, optical processing system 302 may include elements of free space optics 115, optical circuits 101, optical drivers 103 and optical receivers 104 in LIDAR system 100.

System 300 also includes a signal processing system 303 to, among other things, measure energy of the electrical signal 314 in the frequency domain, to compare the energy to an estimate of LIDAR system noise, and to determine a likelihood that a signal peak in the frequency domain indicates a detected target. According to some embodiments, signal processing system 303 may include elements of signal conversion unit 106, signal conditioning unit 107, LIDAR control systems 110 and signal processing unit 112 in LIDAR system 100.

Figure 3B:
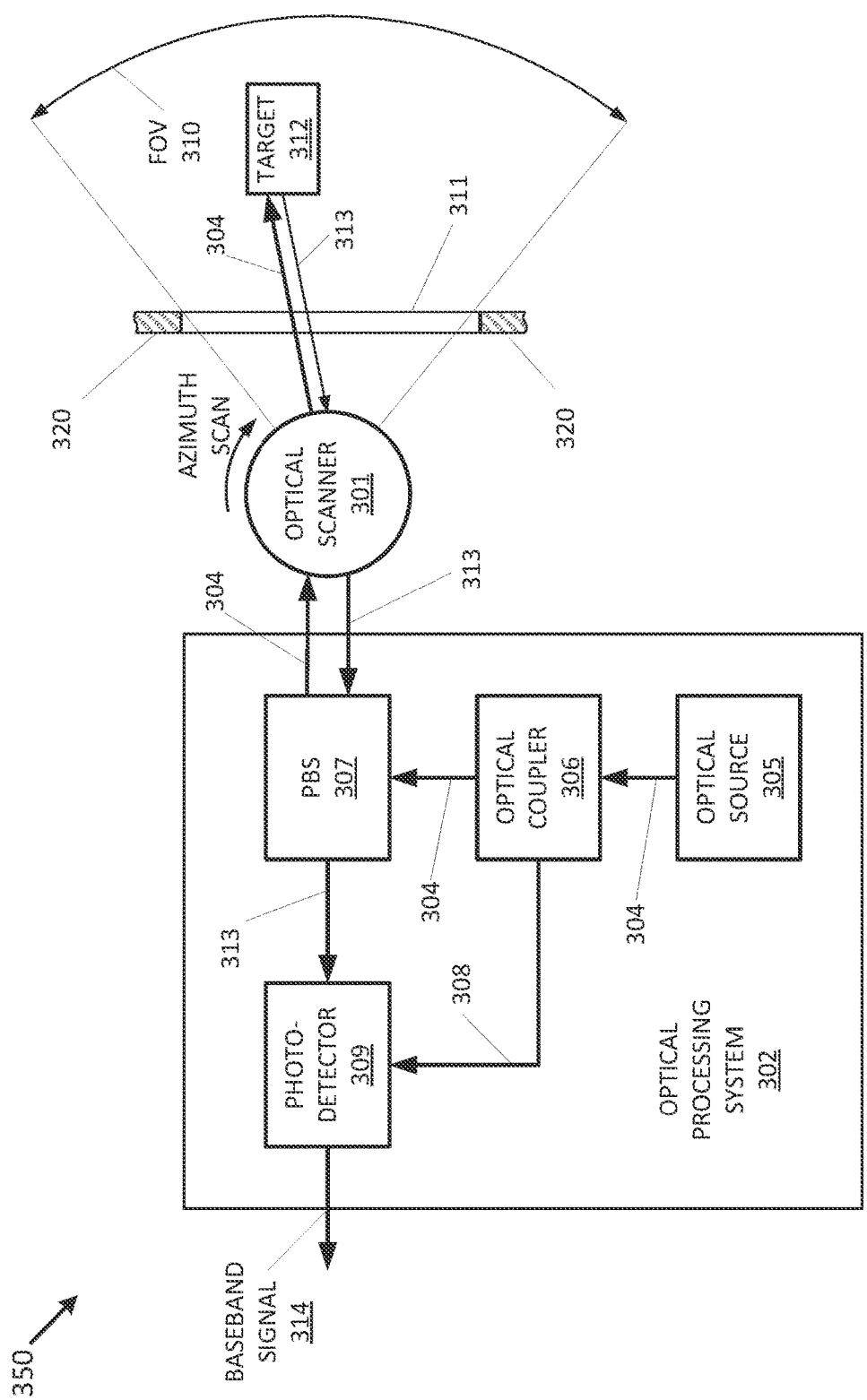
FIG. 3B is a block diagram illustrating an electro-optical optical system according to the present disclosure.

FIG. 3B is a block diagram illustrating an example electro-optical system 350. According to some embodiments, electro-optical system 350 includes the optical scanner 301, similar to the optical scanner 102 illustrated and described in relation to FIG. 1. Electro-optical system 350 also includes the optical processing system 302, which as noted above, may include elements of free space optics 115, optical circuits 101, optical drivers 103, and optical receivers 104 in LIDAR system 100.

Electro-optical processing system 302 includes an optical source 305 to generate the frequency-modulated continuous-wave (FMCW) optical beam 304. The optical beam 304 may be directed to an optical coupler 306 that is configured to couple the optical beam 304 to a polarization beam splitter (PBS) 307 and a sample 308 of the optical beam 304 to a photodetector (PD) 309. The PBS 307 is configured to direct the optical beam 304, because of its polarization, toward the optical scanner 301. Optical scanner 301 is configured to scan a target environment with the optical beam 304, through a range of azimuth and elevation angles covering the field of view (FOV) 310 of a LIDAR window 311 in an enclosure 320 of the optical system 350. In FIG. 3B, for ease of illustration, only the azimuth scan is illustrated.

As shown in FIG. 3B, at one azimuth angle (or range of angles), the optical beam 304 passes through the LIDAR window 311 and illuminates a target 312. A return signal 313 from the target 312 passes through LIDAR window 311 and is directed by optical scanner 301 back to the PBS 307.

The return signal 313, which will have a different polarization than the optical beam 304 due to reflection from the target 312, is directed by the PBS 307 to the photodetector (PD) 309. In PD 309, the return signal 313 is optically mixed with the local sample 308 of the optical beam 304 to generate an electrical signal 314 (e.g., beat signal) with a frequency that is proportional to the range of the scanned target. The electrical signal 314 may be generated by the frequency difference between the local sample 308 of the optical beam 304 and the return signal 313 versus time (i.e., $\Delta f_R(t)$).

Figure 4:
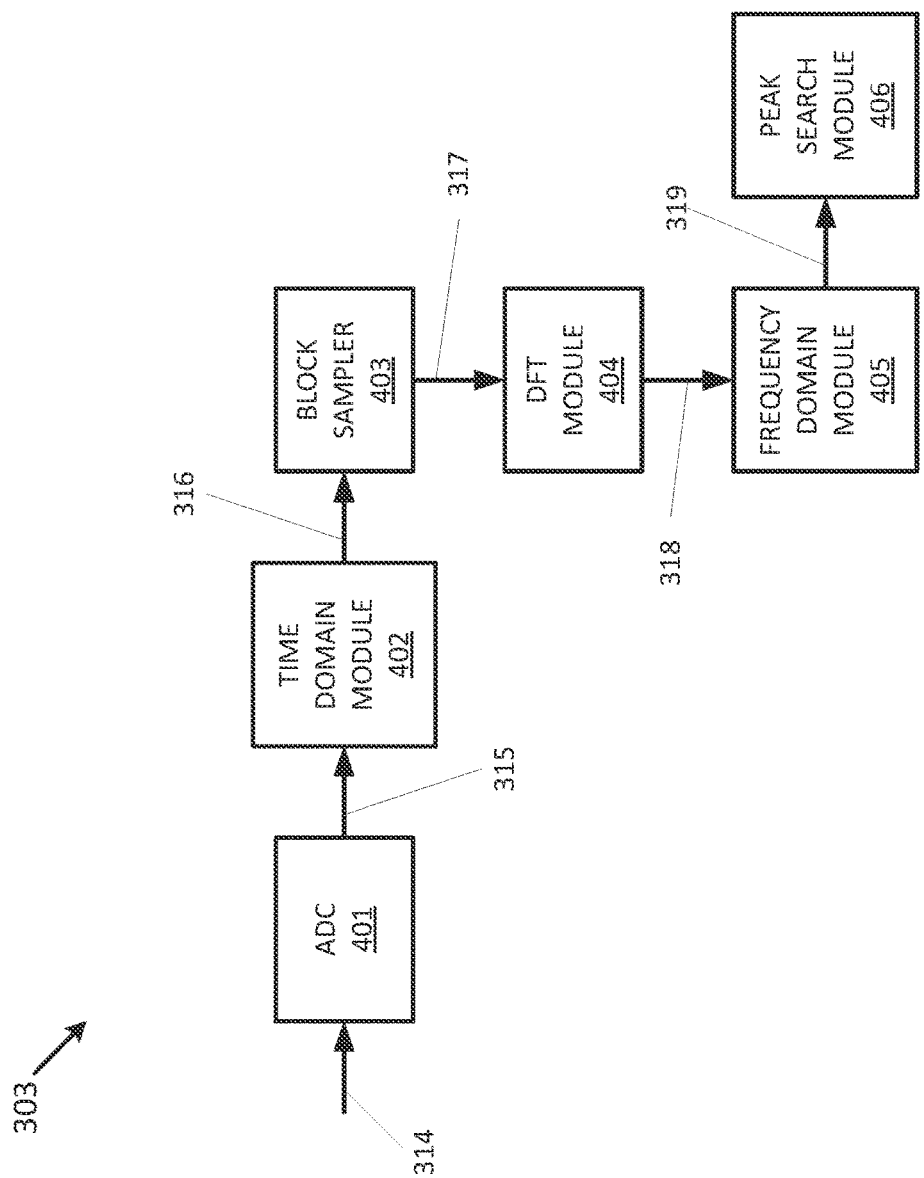
FIG. 4 is a block diagram of an example signal processing system according to the present disclosure.

FIG. 4 is a detailed block diagram illustrating an example of the signal processing system 303, which processes the electrical signal 314, according to some embodiments. As noted above, signal processing unit 303 may include elements of signal conversion unit 106, signal conditioning unit 107, LIDAR control systems 110 and signal processing unit 112 in LIDAR system 100.

According to some embodiments, signal processing system 303 includes an analog-to-digital converter (ADC) 401, a time domain signal processor 402, a block sampler 403, a discrete Fourier transform processor 404, a frequency domain signal processor 405, and a peak search processor 406. The component blocks of signal processing system 303 may be implemented in hardware, firmware, software, or some combination of hardware, firmware and software.

In FIG. 4, the electrical signal 314, which is a continuous analog signal in the time domain, is sampled by ADC 401 to generate a series of time domain samples 315. The time domain samples 315 are processed by the time domain module 402, which conditions the time domain samples 315 for further processing. For example, time domain module 402 may apply weighting or filtering to remove unwanted signal artifacts or to render the signal more tractable for subsequent processing. The output 316 of time domain module 402 is provided to block sampler 403. Block sampler 403 groups the time domain samples 316 into groups of N samples 317 (where N is an integer greater than 1), which are provided to DFT module 404. DFT module 404 transforms the groups of N time domain samples 317 into N frequency bins or subbands (e.g., subband signal spectrum 319) in the frequency domain, covering the bandwidth of the electrical signal 314. The N subband signal spectrum 319 is provided to frequency domain module 405, which conditions the subbands for further processing. For example, frequency domain module 405 may resample and/or average the subband signal spectrum 319 for noise reduction. Frequency domain module 405 may also calculate signal statistics and system noise statistics. The processed subband signal spectrum 319 is then provided to a peak search module 406 that searches for signal peaks representing detected targets in the FOV of the LIDAR system 300.

In some embodiments, the subband signal spectrum 319 provided to the peak search module 406 is the sum of the energy in the target return 313 and all of the noise contributed by the LIDAR system 300 as the target return signal is processed. In some scenarios, electronic systems have sources of noise that limit the performance of those systems by creating a noise floor, which is the combined level of all sources of noise in the system. In order to be detected, a signal in an electronic system such as the subband signal spectrum 319, developed from the electrical signal 314, must be above the noise floor absent specialized signal processing techniques such as signal integration and noise averaging.

Sources of noise in a LIDAR system, such as LIDAR system 300, may include thermal noise, 1/f noise, shot noise, impulse noise, RIN (relative intensity noise associated with lasers), TIA (trans-impedance amplifier) noise, and ADC (analog-to-digital conversion) noise. System noise may be characterized, for example, by its energy versus frequency profile across frequency bins, by its first moments (mean) across the frequency bins, by its second moments (variance) across the frequency bins, by its third moment (asymmetry) across the frequency bins, and/or by its fourth moment (kurtosis, or the sharpness of peaks) across the frequency bins of the frequency spectrum.

Figure 5:
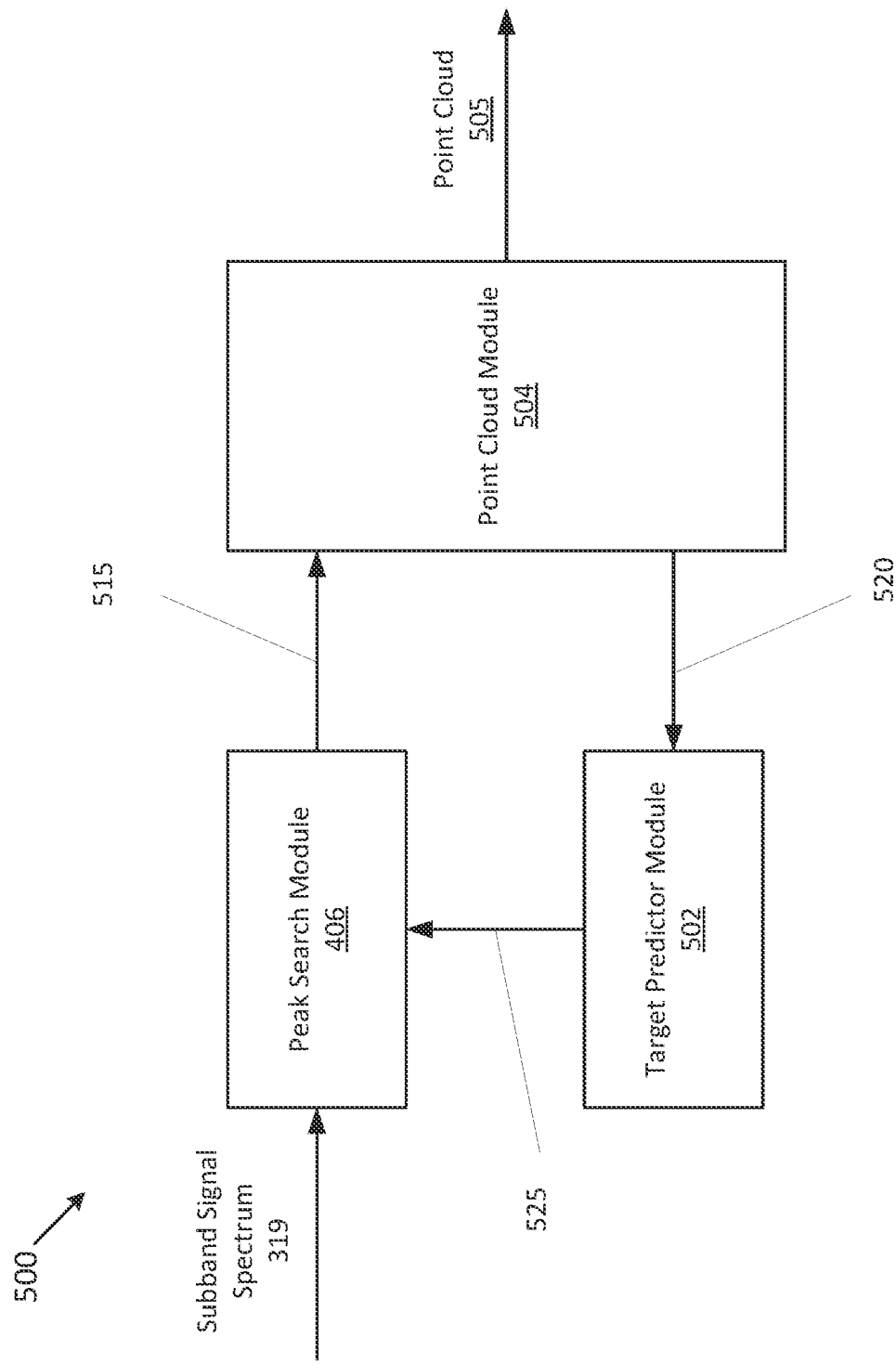
FIG. 5 is a block diagram of an example signal processing system for peak detection using threshold adjustment at estimated target location according to the present disclosure.
Figure 6A:
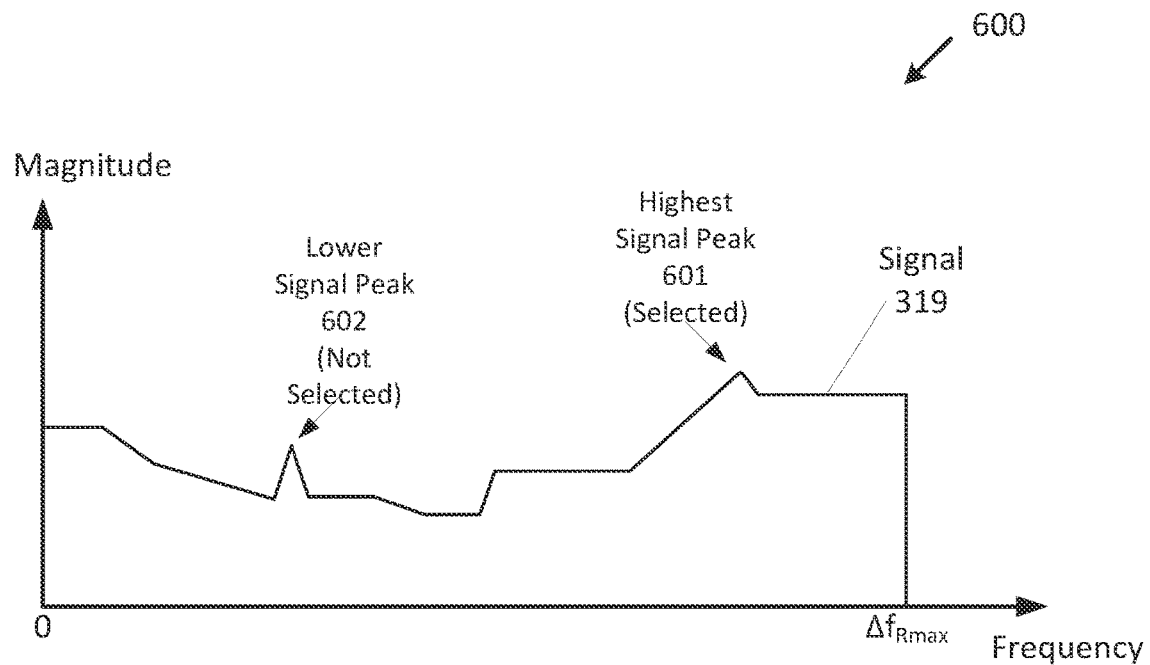
FIG. 6A is a signal magnitude-frequency diagram illustrating an example method of peak detection according to the present disclosure.
Figure 6B:
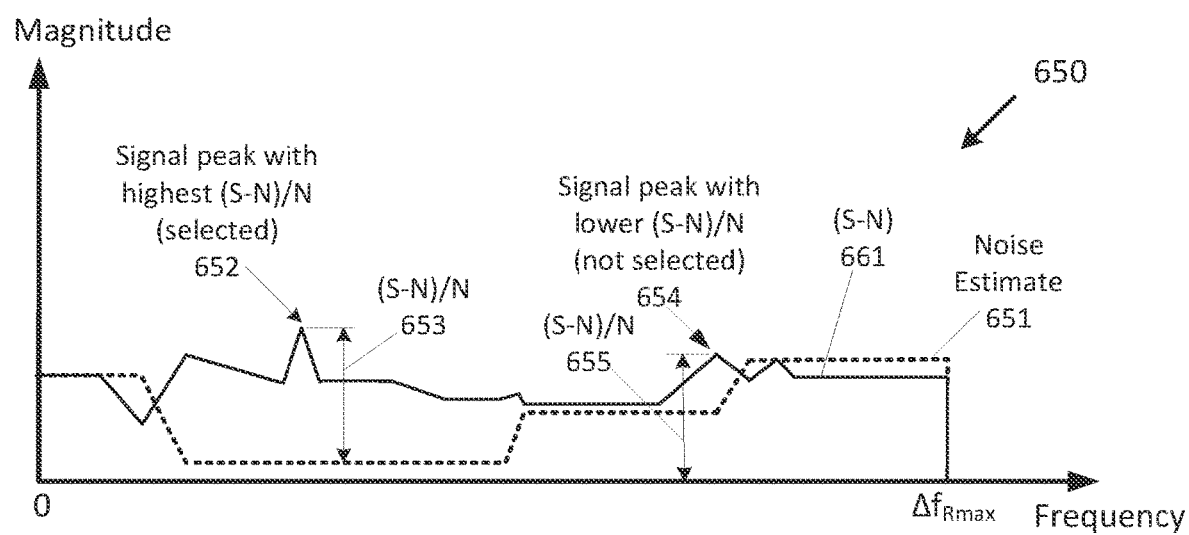
FIG. 6B is a signal magnitude-frequency diagram illustrating a noise estimate compared to a difference between a signal spectrum and the noise estimate according to the present disclosure.
Figure 7:
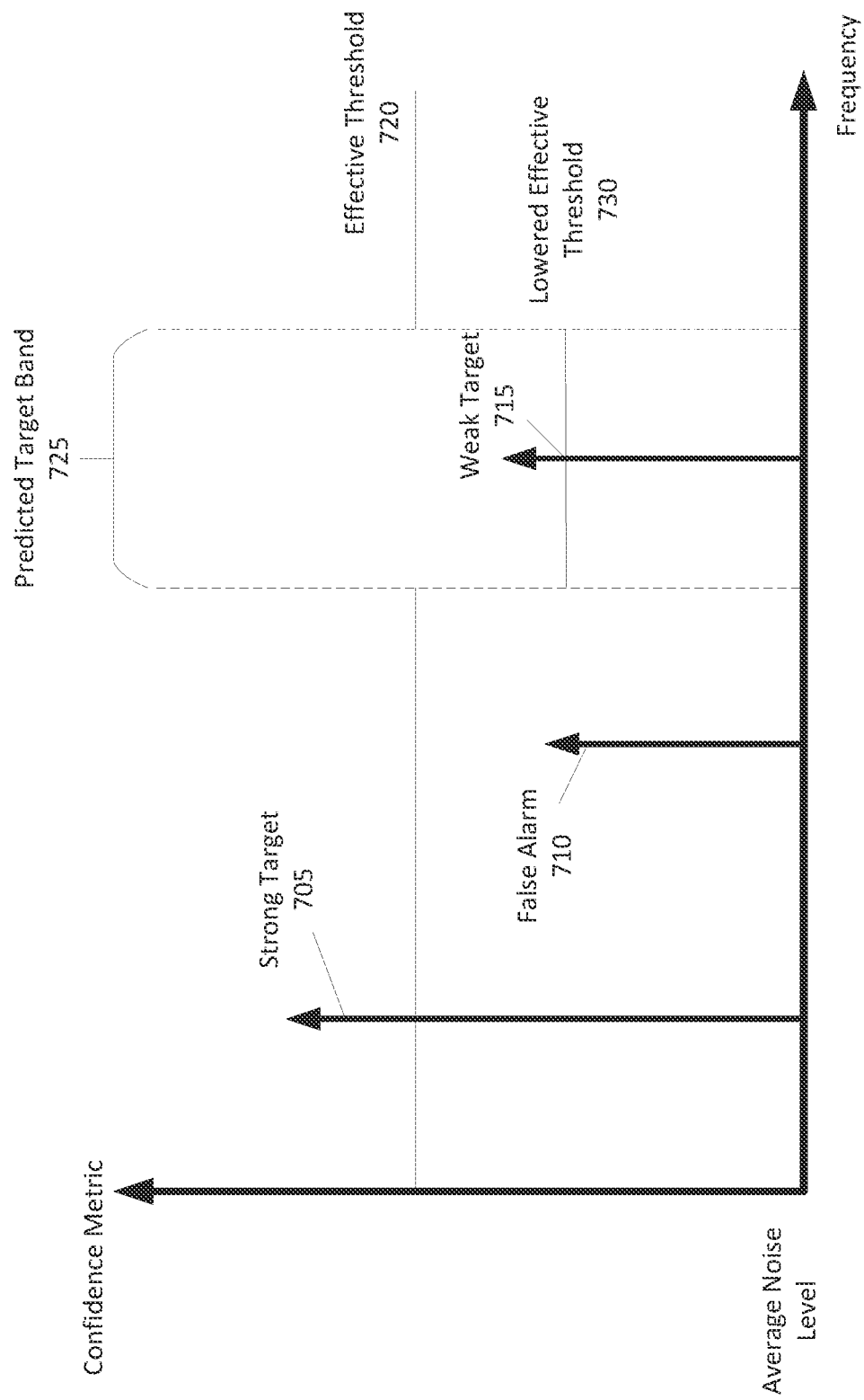
FIG. 7 is a signal confidence-frequency diagram illustrating an example method of threshold adjustment for peak detection according to the present disclosure.

FIG. 5 is a block diagram illustrating an example of a system 500 to perform a peak search with automatic adjustment of detection threshold according to some embodiments. System 500 may be the same or similar to signal processing system 303 of FIG. 3. Additionally, system 500 may include, or be included in, one or more of the elements of LIDAR system 100 of FIG. 1 (e.g., signal conversion unit 106, signal conditioning unit 107, LIDAR control systems 110 and signal processing unit 112). The system 500 includes a peak search module 406, a target predictor 502, and point cloud module 504. The peak search module 406 may receive the subband signal spectrum 319 as described above. The peak search module 406 may detect one or more peaks from the subband signal spectrum 319 (as illustrated in FIGS. 6A, 6B and 7 below). The peak search module 406 may compare a detection confidence metric (e.g., the difference between signal energy and the noise floor to noise ratio (S−N/N)) to a detection threshold. In some scenarios, if the detection confidence metric of a frequency peak is above the detection threshold, then the peak search module 406 may identify the frequency peak as a confirmed target detection while filtering peaks that are below the detection threshold (e.g., false alarm detections). In some scenarios, a peak that exceeds the detection threshold may indicate a high probability that the peak corresponds to a valid target detection.

The peak search module 406 may provide one or more identified peaks 515 in the subband signal spectrum 319 to the point cloud module 504. The point cloud module 504 may generate a point cloud 505 from the one or more identified peaks and other information from the frame (i.e., detected targets). The point cloud module 504 may further identify contextual information 520 (e.g., target classification, estimated target velocity, type of scene, previous point cloud information) in proximity to the detections. The point cloud module 504 may provide the contextual information 520 to the target predictor 502.

The target predictor 502 may estimate a target location 525 of previous detections. For example, the target predictor 502 may utilize the contextual information 520 to estimate the current target location 525. The contextual information 520 may include one or more previous frames which may include a respective detection of the target. The target predictor 502 may then use the detections of the target in the previous frames to estimate the current location of the target. In another example, the target predictor 502 may estimate the target location 525 using the median location of the detections in the previous frames. It should be noted that the target predictor may use any number of previous frames, or neighboring points in the point cloud, to perform the average, median, or any other calculation to estimate the target location. In another example, the contextual information 520 may include higher level information from the point cloud 505 about an object associated with the detection and the expected behavior of the object (e.g., a vehicle, a person, a stationary object, etc.).

FIG. 6A is a diagram 600 illustrating magnitude versus frequency of the subband signal spectrum 319 that includes system noise, shown as a continuous waveform (rather than as discrete frequency bins or subbands) for ease of illustration. Diagram 600 may be generated and/or used by signal processing system 303 of FIG. 3. Additionally, diagram 600 may be generated and/or used by one or more of the elements of LIDAR system 100 of FIG. 1 (e.g., signal conversion unit 106, signal conditioning unit 107, LIDAR control systems 110 and signal processing unit 112). The frequencies span the range from 0 to $\Delta f_{R_{max}}$. In some scenarios, without more information about the subband signal spectrum 319, the peak search module 406 would select the highest signal peak 601 as the return signal that most likely indicates the presence of a target, and not select a lower signal peak 602, for example. However, if the peak search module 406 had an estimate of the system noise, it could compare the subband signal spectrum 319 to the system noise estimate and could make a more informed selection based on additional selection criteria (i.e., a confidence metric). In FIGS. 6A and 6B, signal and noise values are depicted as energy versus frequency contours. However, as previously noted, the system noise may be additionally characterized by any of its first through fourth moments representing mean energy, energy variance, energy asymmetry and kurtosis versus frequency, respectively. In addition to energy alone, the signal may be characterized in terms of autocorrelation statistics across the frequency bins in the baseband and/or cross-correlation statistics between the signal and the system noise estimate across the frequency bins.

In one example, an estimate of system noise can be obtained by operating a LIDAR system, such as LIDAR system 300, in an anechoic (no-echo) calibration mode where there is no detectable return signal (e.g., return signal 313). This mode of operation generates all of the normal system noise mechanisms and results in a subband signal spectrum 319 that includes energy only from the system noise sources.

FIG. 6B is an energy versus frequency diagram 650 comparing the noise estimate 651 to the difference between the subband signal spectrum 319 and the noise estimate 651, diagrammed in FIG. 6B as signal minus noise (S−N) 661. In the example of FIG. 6B, the peak search module 406 may be configured to select the signal peak with the highest non-negative signal minus noise to noise ratio (S−N)/N. Under this selection criteria, signal peak 652 with (S−N)/N 653 would be selected over signal peak 654 with (S−N)/N 655 because (S−N)/N 653 is larger than (S−N)/N 655.

In some examples, the signal processing system 303 may be configured to modify the subband signal (e.g., subband signal spectrum 319) and the system noise estimate (e.g., system noise estimate 651) to generate a confidence metric (e.g., (S−N)/N) used to improve to the likelihood that a signal peak in the frequency domain indicates a detected target and to decrease the likelihood that a signal peak in the frequency domain from a false target will be interpreted as a real target. Additionally, as discussed above with respect to FIG. 5 and below in FIG. 7, the peak search module 406 may adjust a detection threshold of the confidence metric using an estimated location of a target.

FIG. 7 depicts a signal confidence-frequency diagram 700 illustrating an example method of threshold adjustment for peak detection according to the present disclosure. Diagram 700 may be generated and/or used by signal processing system 303 of FIG. 3 or peak search module of FIGS. 4 and 5. Additionally, diagram 700 may be generated and/or used by one or more of the elements of LIDAR system 100 of FIG. 1 (e.g., signal conversion unit 106, signal conditioning unit 107, LIDAR control systems 110 and signal processing unit 112). Diagram 700 depicts three potential target detections including a strong signal target detection 705, a false alarm detection 710, and a weak signal target detection 715. Diagram 700 further depicts an effective threshold 720 of the confidence metric, also referred to herein as a confidence threshold (as described above with respect to FIG. 6B). The effective threshold 720 of the confidence metric may be the minimum confidence threshold for a signal to be identified as a detection. The strong signal target detection 705 is greater than the higher (i.e., non-adjusted) effective threshold 720 so it will be detected without adjustment of the effective threshold 720. The second potential detection is a potential false alarm detection 710 (i.e., a peak that does not correspond to an actual target). Accordingly, if the effective threshold 720 were lowered too much then the false alarm detection 710 would be identified as an actual detection although it does not correspond to a target. The third potential detection is a weak signal target 715. As depicted, the weak signal target 715 would not exceed the effective threshold 720 for the confidence metric and would therefore not be registered as a detection.

To provide for a higher probability of detection of weak signal targets (e.g., weak target 715) while keeping the probability of false detections (e.g., false alarm 710) low, the peak search module 406 may reduce the effective threshold 720 around a predicted location of the weak target 715 (i.e., predicted target band 725). The predicted target band 725 may be a predefined frequency range around the expected target frequency (i.e., target location) or may be determined dynamically based on a confidence associated with the estimated target location. For example, the peak search module 406 may determine a larger predicted target band 725 for estimated locations with a low confidence (e.g., if the variance associated with the estimate is high) and a smaller predicted target band 725 for estimated locations with a high confidence (e.g., low variance associated with the estimate). Accordingly, the lowered effective threshold 730 within the predicted target band 725 may allow the peak search module 406 to detect the weak target 715 while preventing the false alarm 710 from being detected because the effective threshold 720 is adjusted to the lowered effective threshold 730 only for a small region of frequencies. For example, the predicted target band 725 may cover frequencies associated with a physical detection range of approximately 5-10 meters. It should be noted that the predicted target band 725 may span any range of frequencies of the LIDAR system and any range of corresponding physical distances.

In one embodiment, a target predictor (e.g., target predictor 502 of FIG. 5) may estimate locations for targets that have previously been detected with a weak signal. For example, the target predictor 502 may estimate locations for targets that have been previously detected with a signal that has a low SNR. In another example, the target predictor 502 may calculate the estimated location for target detections with a confidence metric just above the higher (i.e., non-adjusted) effective threshold 720. The peak search module 406 may then lower the effective thresholds only for those weak signal targets for which estimated locations have been calculated.

Figure 8:
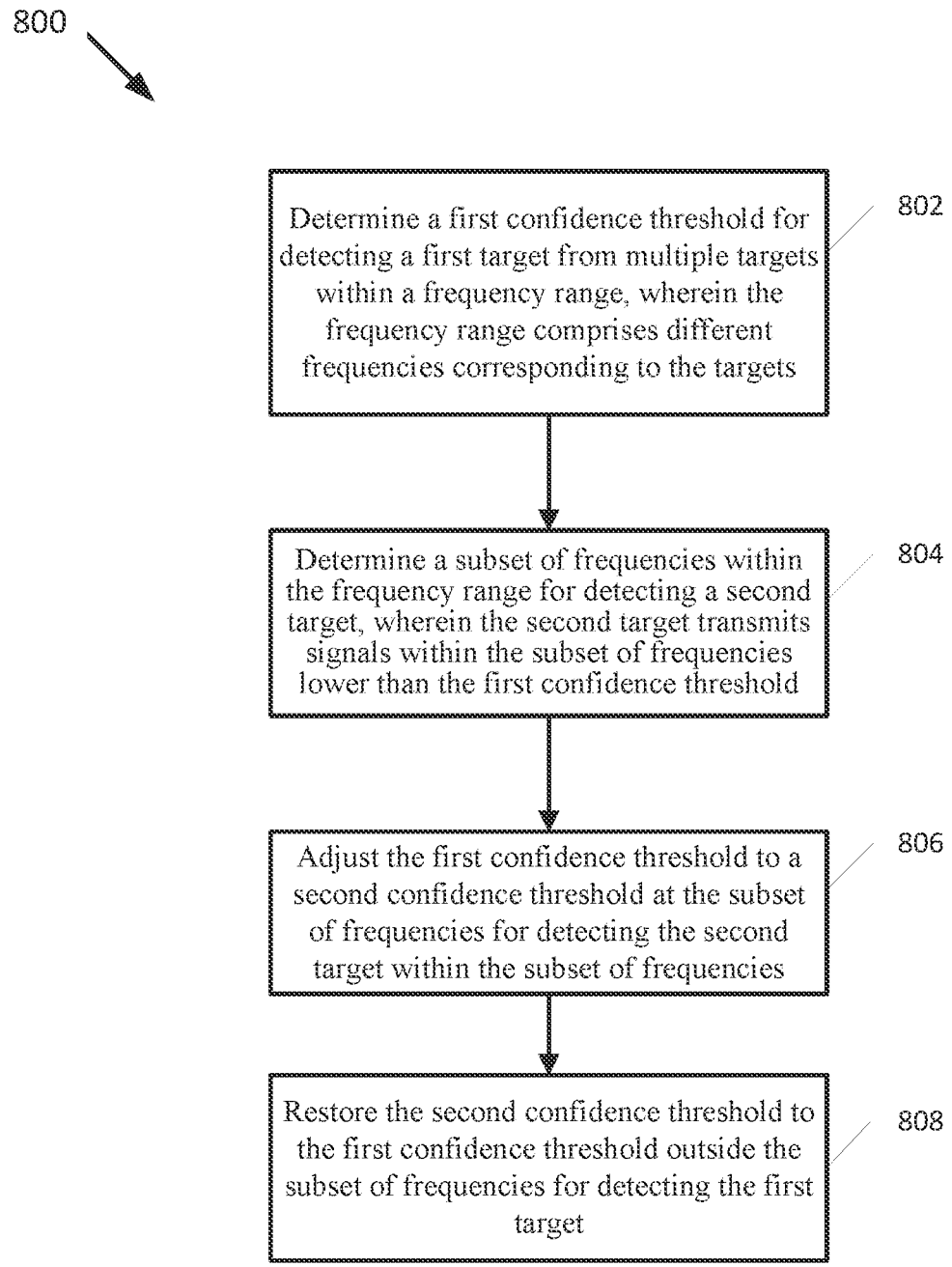
FIG. 8 is a flowchart illustrating a method for noise calibration and target detection according to the present disclosure.

FIG. 8 is a flowchart illustrating a method 800 in a LIDAR system, such as LIDAR system 100 or LIDAR system 300, automatic adjustment of a detection threshold based on an estimated location of a target. Method 800 may be performed by one or more of the elements of LIDAR system 100 of FIG. 1 (e.g., signal conversion unit 106, signal conditioning unit 107, LIDAR control systems 110 and signal processing unit 112).

Method 800 begins at operation 802, where processing logic (e.g., peak search module 406) determines a first confidence threshold for detecting a first target from multiple targets within a frequency range, wherein the frequency range comprises different frequencies corresponding to the targets. The first confidence threshold may correspond to a confidence metric of a target signal. The confidence metric may be a signal-to-noise ratio (SNR), a signal minus noise to noise ratio ((S−N)/N), or a likelihood ratio providing a confidence value for a target detection. A confidence metric may be calculated for each target signal. Determining the confidence metric may include determining a noise estimate across the frequency domain of the baseband signal, and calculating a difference between a magnitude of frequencies of the baseband signal and the noise estimate across the frequency domain.

At operation 804, processing logic (e.g., peak search module 406 and/or target predictor module 502) determines a subset of frequencies within the frequency range for detecting a second target, wherein the second target transmits signals within the subset of frequencies lower than the first confidence threshold. In some embodiments, the subset of frequencies corresponds to an estimated location of the second target. In one example, to determine the estimated location of the target, the processing logic (e.g., target predictor module 502) identifies detections of the second target in the time domain or frequency domain, and determines the estimated location of the second target based on neighboring detections such as along azimuth, elevation, spatially (3D point cloud) or temporally (detections from previous frames). In one example, to determine the estimated location of the second target, the processing logic (e.g., target predictor module 502) may identify point cloud information associated with the second target, and determine the estimated location of the second target based on the point cloud information.

At operation 806, processing logic (e.g., peak search module 406) adjusts the first confidence threshold to a second confidence threshold at the subset of frequencies for detecting the second target within the subset of frequencies. The processing logic (e.g., peak search module 406) may use the second confidence threshold to filter false alarm peak detections that are less than the first detection threshold. To adjust the detection threshold, the processing logic (e.g., peak search module 406) may reduce the detection threshold within the subset of frequencies (i.e., target band frequency range) corresponding to the estimated location of the target. In one embodiment, the target band frequency range is a predefined range of frequencies near the frequency corresponding to the estimated target location. In another embodiment, the processing logic (e.g., peak search module 406) determines a width of the target band frequency range based on a confidence associated with the estimated location of the second target.

At operation 808, processing logic (e.g., peak search module 406) restores the second confidence threshold to the first confidence threshold outside the subset of frequencies for detecting the first target. In one embodiment, the processing logic (e.g., peak search module 406) may compare a peak of the current detection of the second target with the reduced second confidence threshold. In one embodiment, in response to determining that the peak exceeds the reduced second confidence threshold, the processing logic (e.g., peak search module 406) determines the actual location of the target based on the current detection. In one embodiment, processing logic (e.g., peak search module 406) may determine whether the one or more previous detections of the target comprises a weak detection signal. The processing logic (e.g., peak search module 406) may further determine the estimated target location and adjust the detection threshold in response to determining that the one or more previous detections of the target comprises the weak detection signal.

Figure 9:
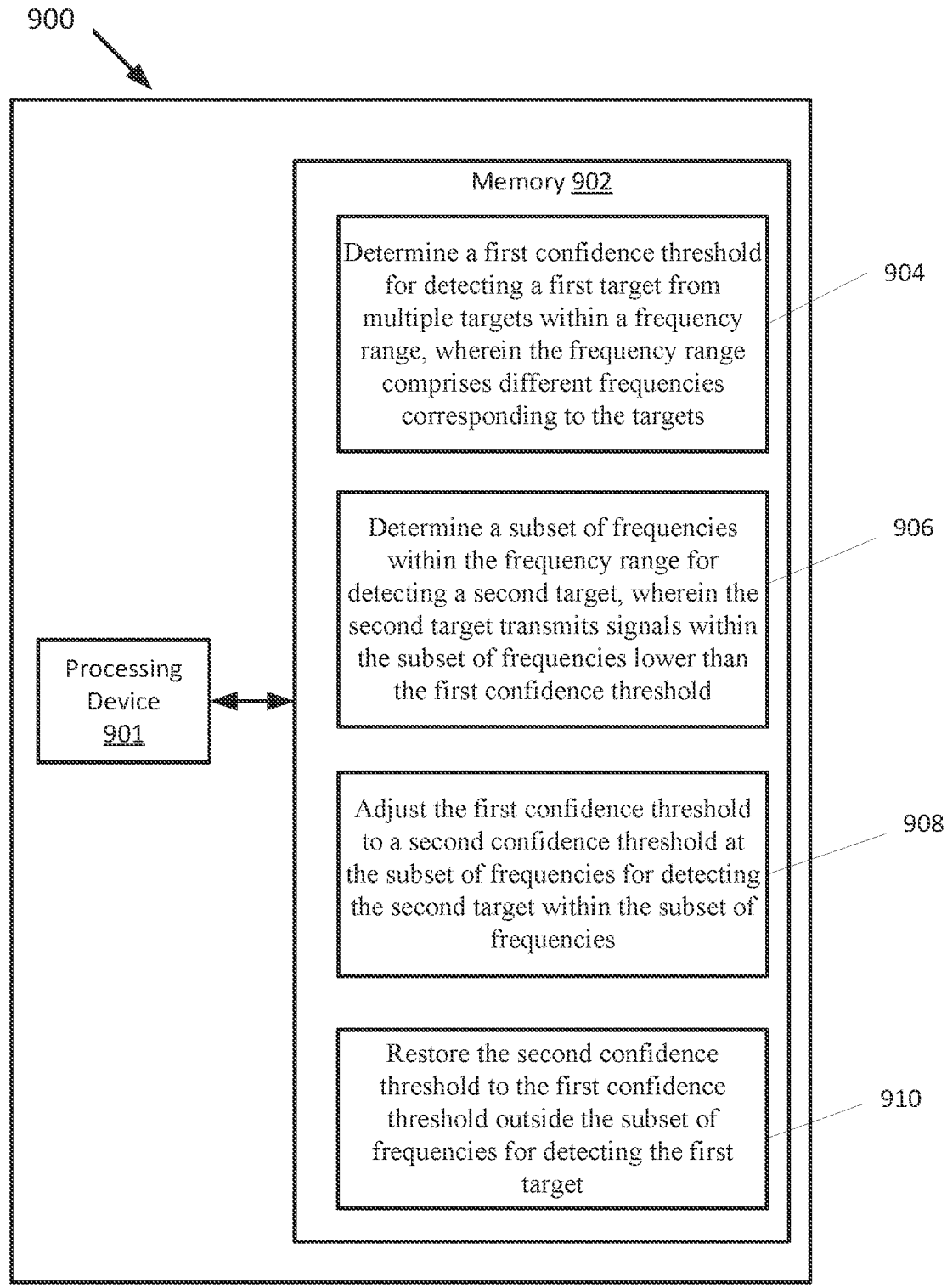
FIG. 9 is a block diagram of an example signal processing system according to the present disclosure.

FIG. 9 is a block diagram of a processing system 900 (e.g., similar to signal processing system 303 illustrated and described above with respect to FIG. 4) in a LIDAR system such as LIDAR system 100 or LIDAR system 300. Processing system 900 includes a processing device 901, which may be any type of general purpose processing device or special purpose processing device designed for use in the LIDAR system. Processing device 901 is coupled with a memory 902, which can be any type of non-transitory computer-readable medium (e.g., RAM, ROM, PROM, EPROM, EEPROM, flash memory, magnetic disk memory or optical disk memory) containing instructions that, when executed by processing device 901 in the LIDAR system, cause the LIDAR system to perform the method described herein. In particular, memory 902 includes instructions 904 to determine a first confidence threshold for detecting a first target from multiple targets within a frequency range, wherein the frequency range comprises different frequencies corresponding to the plurality of targets. The memory 902 includes instruction 906 to determine a subset of frequencies within the frequency range for detecting a second target, wherein the second target transmits signals within the subset of frequencies lower than the first confidence threshold and instruction 908 to adjust the first confidence threshold to a second confidence threshold at the subset of frequencies for detecting the second target within the subset of frequencies. Memory 902 further includes instruction 910 to restore the second confidence threshold to the first confidence threshold outside the subset of frequencies for detecting the first target.

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in simple block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operation may be performed, at least in part, concurrently with other operations. Instructions or sub-operations of distinct operations may be performed in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation.

What is claimed is:

1. A light detection and ranging (LIDAR) system, comprising:
    an optical scanner to transmit an optical beam towards, and receive a return signal from, a target;

an optical processing system coupled to the optical scanner to generate a baseband signal in a time domain from the return signal, the baseband signal comprising frequencies corresponding to LIDAR target ranges; and a signal processing system coupled to the optical processing system, comprising:

a processor; and a memory operatively coupled to the processor, the memory to store instructions that, when executed by the processor, cause the LIDAR system to:

determine a first confidence threshold with respect to a confidence metric for detecting a first target from a plurality of targets within a range of frequencies associated with the baseband signal, wherein the range of frequencies comprises a plurality of different frequency peaks corresponding to the plurality of targets;

determine a subset of frequencies within the range of frequencies for detecting a second target, wherein a frequency peak associated with the second target is included within the subset of frequencies, and wherein the frequency peak associated with the second target has a confidence metric value lower than the first confidence threshold;

adjust the first confidence threshold to a second confidence threshold at the subset of frequencies for detecting the second target within the subset of frequencies; and restore the second confidence threshold to the first confidence threshold outside the subset of frequencies for detecting the first target.

2. The system of claim 1, wherein to determine the first confidence threshold, the processor is further to:

determine a noise estimate across the range of frequencies; and calculate a difference between a magnitude of signals for the range of frequencies and the noise estimate across the range of frequencies.

3. The system of claim 2, wherein the first confidence threshold is based on at least one of a signal-to-noise ratio providing a confidence value for a target detection.

4. The system of claim 1, wherein to determine the subset of frequencies within the range of frequencies for detecting the second target the processor is to:

determine the subset of frequencies based on an estimated location of the second target.

5. The system of claim 4, wherein the processor is further to:

identify previous detections of the second target in the time domain or a frequency domain; and determine the estimated location of the second target based on the previous detections of the second target.

6. The system of claim 4, wherein to determine the estimated location of the second target, the processor is to:

identify point cloud information associated with the second target; and determine the estimated location of the second target based on the point cloud information.

7. The system of claim 1, wherein the subset of frequencies comprises a predefined range of frequencies corresponding to a previously detected location of the second target.

8. A method, comprising:

determining a first confidence threshold with respect to a confidence metric for detecting a first target from a plurality of targets within a range of frequencies, wherein the range of frequencies comprises a plurality of different frequency peaks corresponding to the plurality of targets;

determining, by a processing device, a subset of frequencies within the range of frequencies for detecting a second target, wherein a frequency peak associated with the second target is included within the subset of frequencies, and wherein the frequency peak associated with the second target has a confidence metric value lower than the first confidence threshold;

adjusting, by the processing device, the first confidence threshold to a second confidence threshold at the subset of frequencies for detecting the second target within the subset of frequencies;

restoring the second confidence threshold to the first confidence threshold outside the subset of frequencies for detecting the first target; and determining one or more properties of the second target based on the frequency peak associated with the second target corresponding to a detection of the second target by the second confidence threshold.

9. The method of claim 8, wherein determining the first confidence threshold comprises determining a noise estimate across the range of frequencies; and calculating a difference between a magnitude of signals in the range of frequencies and the noise estimate across the range of frequencies.

10. The method of claim 9, wherein the first confidence threshold is based on at least one of a signal-to-noise ratio providing a confidence value for a target detection.

11. The method of claim 8, wherein determining the subset of frequencies within the range of frequencies for detecting the second target comprises:

determine the subset of frequencies based on an estimated location of the second target.

12. The method of claim 11, further comprising:

identifying previous detections of the second target in a time domain or a frequency domain; and determining the estimated location of the second target based on the previous detections of the second target.

13. The method of claim 11, wherein determining the estimated location of the second target comprises:

identifying point cloud information associated with the second target; and determining the estimated location of the second target based on the point cloud information.

14. The method of claim 13, wherein the subset of frequencies comprises a predefined range of frequencies corresponding to a previously detected location of the second target.

15. The method of claim 8, wherein adjusting the first confidence threshold comprises:

reducing the first confidence threshold to the second confidence threshold within the subset of frequencies, wherein the subset of frequencies corresponds to an estimated location of the second target.

16. The method of claim 15, further comprising:

determine the subset of frequencies corresponding to the estimated location of the second target based on a confidence value associated with the estimated location of the second target.

17. The method of claim 8, further comprising:

determining whether one or more previous detections of the second target comprises a weak detection signal with respect to the first confidence threshold;

determining an estimated location of the second target; and adjusting the first confidence threshold in response to determining that the one or more previous detections of the second target comprises the weak detection signal.

18. A light detection and ranging (LIDAR) system, comprising:

an optical scanner to transmit an optical beam and receive a plurality of return signals from reflections of the optical beam;

an optical processing system coupled to the optical scanner, the optical processing system to generate an electrical signal from the plurality of return signals;

a signal processing system coupled to the optical processing system, the signal processing system comprising:

a processing device; and a memory operatively coupled the processing device, the memory to store instructions that, when executed by the processing device, cause the LIDAR system to:

determine a first confidence threshold with respect to a confidence metric for detecting a first target from a plurality of targets within a range of frequencies of the electrical signal, wherein the range of frequencies comprises a plurality of different frequency peaks corresponding to the plurality of targets;

estimate a location of a second target based on contextual information associated with the second target, the location corresponding to a subset of frequencies for detecting the second target, and wherein a frequency peak associated with the location of the second target has a confidence metric value lower than the first confidence threshold;

adjust the first confidence threshold to a second confidence threshold at the subset of frequencies for detecting the second target within the subset of frequencies; and restore the second confidence threshold to the first confidence threshold outside the subset of frequencies for detecting the first target.

19. The LIDAR system of claim 18, wherein the second confidence threshold is lower than the first confidence threshold.

20. The LIDAR system of claim 18, wherein the subset of frequencies is determined based on the estimated location of the second target and a confidence value associated with the estimated location of the second target.

* * * * *